United States Patent [19]
Wood et al.

[11] Patent Number: 5,759,019
[45] Date of Patent: Jun. 2, 1998

[54] PROGRESSIVE CAVITY PUMPS USING COMPOSITE MATERIALS

[75] Inventors: Steven M. Wood, 4904 E. 113th, Tulsa, Okla. 74137; Brian E. Spencer, Lincoln, Nebr.

[73] Assignee: Steven M. Wood, Tulsa, Okla.

[21] Appl. No.: 637,086

[22] Filed: Apr. 24, 1996

Related U.S. Application Data

[63] Continuation-in-part of Ser. No. 447,122, May 22, 1995, Pat. No. 5,611,397, which is a continuation-in-part of Ser. No. 194,835, Sep. 14, 1994, Pat. No. 5,417,281.

[51] Int. Cl.$^6$ .................... F04C 2/107; F04C 5/00
[52] U.S. Cl. .................... 418/48; 418/152; 418/153; 418/178; 418/182
[58] Field of Search .................... 418/48, 152, 153, 418/178, 182

[56] References Cited

U.S. PATENT DOCUMENTS

| | | | |
|---|---|---|---|
| 2,739,650 | 3/1956 | Hill | 166/106 |
| 3,203,350 | 8/1965 | Chang | 418/48 |
| 3,499,389 | 3/1970 | Seeberger et al. | 418/48 |
| 3,840,080 | 10/1974 | Berryman | 175/107 |
| 3,857,654 | 12/1974 | Streicher | 418/48 |
| 3,912,426 | 10/1975 | Tschirky | 418/48 |
| 3,932,072 | 1/1976 | Clark | 418/48 |
| 4,076,466 | 2/1978 | Swanson, Jr. | 417/390 |
| 4,104,009 | 8/1978 | Chanton | 418/48 |
| 4,211,506 | 7/1980 | List et al. | 406/55 |
| 4,415,316 | 11/1983 | Jurgens | 418/48 |
| 4,636,151 | 1/1987 | Eppink | 418/48 |
| 4,718,824 | 1/1988 | Cholet et al. | 417/14 |
| 4,797,075 | 1/1989 | Edwards et al. | 418/48 |
| 4,923,376 | 5/1990 | Wright | 418/48 |
| 5,090,497 | 2/1992 | Beimgraben et al. | 175/107 |
| 5,097,870 | 3/1992 | Williams | 138/115 |
| 5,135,059 | 8/1992 | Turner et al. | 175/107 |
| 5,143,153 | 9/1992 | Bach et al. | 166/68.5 |
| 5,145,342 | 9/1992 | Gruber | 418/48 |
| 5,145,343 | 9/1992 | Belcher | 418/48 |
| 5,171,138 | 12/1992 | Forrest | 418/48 |
| 5,209,294 | 5/1993 | Weber | 166/105 |
| 5,318,416 | 6/1994 | Hantschk et al. | 418/48 |
| 5,363,929 | 11/1994 | Williams et al. | 175/107 |
| 5,417,281 | 5/1995 | Wood et al. | 166/68 |

FOREIGN PATENT DOCUMENTS

| | | | |
|---|---|---|---|
| 1528978 | 7/1969 | Germany | 418/48 |
| 2040748 | 2/1972 | Germany | 418/48 |
| 2713468 | 9/1978 | Germany | 418/48 |

*Primary Examiner*—John J. Vrablik
*Attorney, Agent, or Firm*—Head, Johnson & Kachigian

[57] ABSTRACT

The stator, rotor and/or flex shaft of a progressive cavity pump is made up of composite materials, e.g., fiberglass and resin, in a variety of combinations with and without bonded resilient elastomers. The composites are formulated to provide resiliency and non-resiliency where needed. The flex shaft between the rotary power source and the rotor is made of composite materials and designed to absorb the orbital and gyrational movement of the rotor.

17 Claims, 3 Drawing Sheets

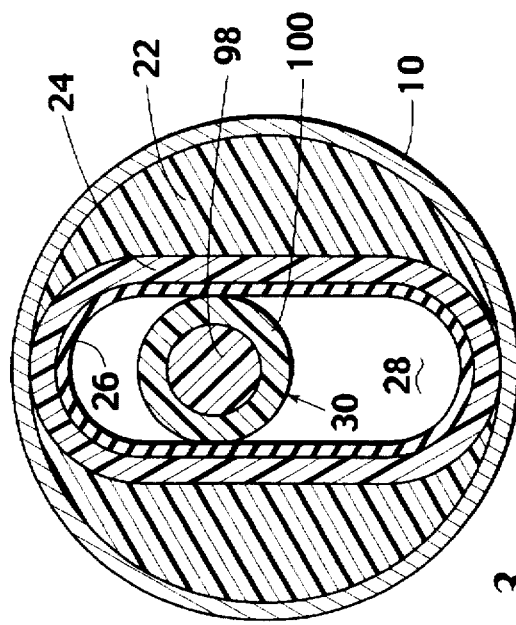
Fig. 2
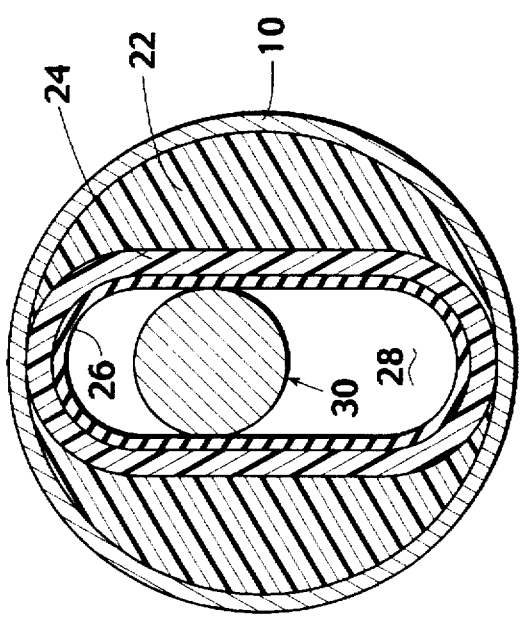
Fig. 3
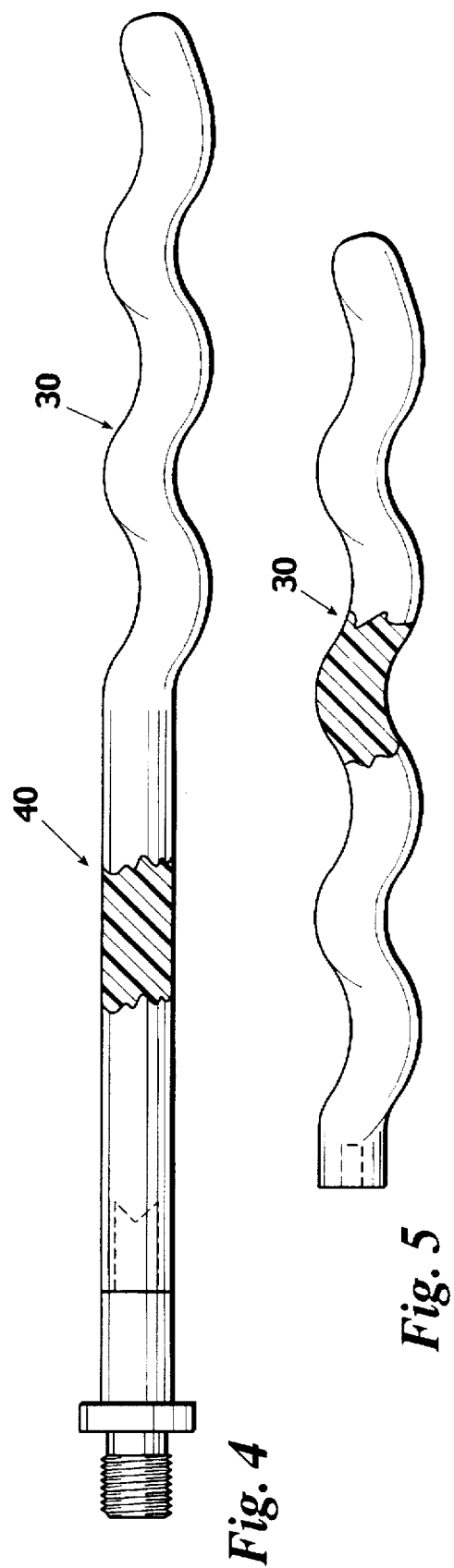
Fig. 4
Fig. 5

PROGRESSIVE CAVITY PUMPS USING COMPOSITE MATERIALS

RELATED PATENTS AND APPLICATIONS

This is a continuation-in-part of application Ser. No. 08/447,122, filed May 22, 1995 now U.S. Pat. No. 5,611,397 which is a continuation-in-part of Ser. No. 08/194,835, filed Feb. 14, 1994, now U.S. Pat. No. 5,417,281, both of which are incorporated herein by reference.

FIELD OF THE INVENTION

This invention relates to improvements in progressive cavity pumps of the type composed of a helicoidal rotor acting with a complimentary helicoidal stator and also well known as a "Moineau pump". Such pumps are widely used in many industries.

BACKGROUND OF THE INVENTION

Progressive cavity pumps have been known since their invention was disclosed in U.S. Pat. No. 1,892,217, entitled "Gear Mechanism" to Moineau. The helicoidal rotor and the stator engage with each other along a sealing line to create cavities which progress axially as the rotor is rotated relative to the stator. Because of the required sealing and sliding contact concept of a Moineau pump, the stator and the rotor become subject to extensive wear, which necessitates frequent replacement of the stator and/or the rotor. Commercially available Moineau pumps, as well as those disclosed in the prior art, require extensive disassembly of the pumping apparatus to replace the worn stator and/or rotor, in addition to the down time loss of use. In the case of use downhole in wells, either drilling the well or producing the fluids therefrom, to be able to decrease the frequency of down time and extend the useful life of the pump is a desired objective.

Because of the nature of a Moineau pump, other parts are affected mainly because the axial centerline of the rotor is required to orbit or gyrate relative to the centerline of the stator or vice versa. Thus, there is a great deal of flexture that must be accounted for to obtain long life of parts. The art is filled with various types of universal joints, flexible shafts, and mechanical connections to compensate for the orbital or gyrating type of motion. Many of these are disclosed in U.S. Pat. No. 4,923,376.

Heretofore, the conventional Moineau pump art has used a rubber or elastomer materials bonded to steel for the stator contact surface. Such elastomers include not only natural rubber, but also synthetics, such as G.R.S., Neoprene, Butyl and Nitrile rubbers, although there are other types such as soft PVC. The key, of course, is to make the elastomer property soft enough to maintain the sealed cavity, yet be hard enough to withstand the abrasive wear from the working contact between the rotor and the stator. The rotor in these instances is usually made of steel. Some efficiency of the pump is lost because the elastomer mold must be thicker at the peaks of the helicoid in order to create the progressive cavity. This lack of uniform thickness creates compressibility differences which, at increasing pressures, causes bypass of the fluids being pumped. Thus, the pump reaches a point where it is less efficient at ever increasing pressure. Because of the different thicknesses, there are different expansion characteristics and different rates and the pump does more work and builds up heat from the friction.

Rubber used as the stator contact surface is not preferable in high temperature environments because of its low heat conductivity. In addition, as progressive cavity pumps increase in diameter, length and flow characteristics to maintain a successful and long lasting bond of the rubber to a steel housing becomes more difficult. Also, where hydrocarbons make up the material to be pumped, such as in oil producing wells, rubber is known to deteriorate. One attempt to overcome these problems is taught in U.S. Pat. No. 3,912,426 by using multiple stators connected in series with separate but connected rotors for each stator. The stators, however, are still composed of rubber.

Composite fibers have been taught for a variety of products for their numerous characteristics of high strength, stiffness, light weight, etc., but have not been utilized successfully for use in Moineau pump designs.

SUMMARY OF THE INVENTION

It is an overall object of this invention to disclose new forms of stators, rotors and flex shafts for increasing the efficiency and longevity of progressive cavity pumps. To that end, the primary object of this invention is to provide the use of composites or variations of composites alone or in combination with elastomers in the makeup of the stator and/or rotor and/or flex shaft of progressive cavity pumps.

Another object is to provide the use of progressive cavity pumps manufactured according to this invention which are capable of use in producing fluids from well bores such as taught in the aforesaid co-pending application and U.S. Pat. No. 5,417,281, and for other above ground applications.

BRIEF DESCRIPTION OF THE DRAWINGS

FIG. 2 is a sectional view of one form of progressive cavity pump.

FIG. 3 is a sectional view of another form of progressive cavity pump.

FIG. 4 is an elevational view of a composite combination flex shaft and rotor formed as one component.

FIG. 5 is an elevational view of a composite rotor formed separately from the flex shaft.

DETAILED DESCRIPTION OF THE PREFERRED EMBODIMENT

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

Figure 1:
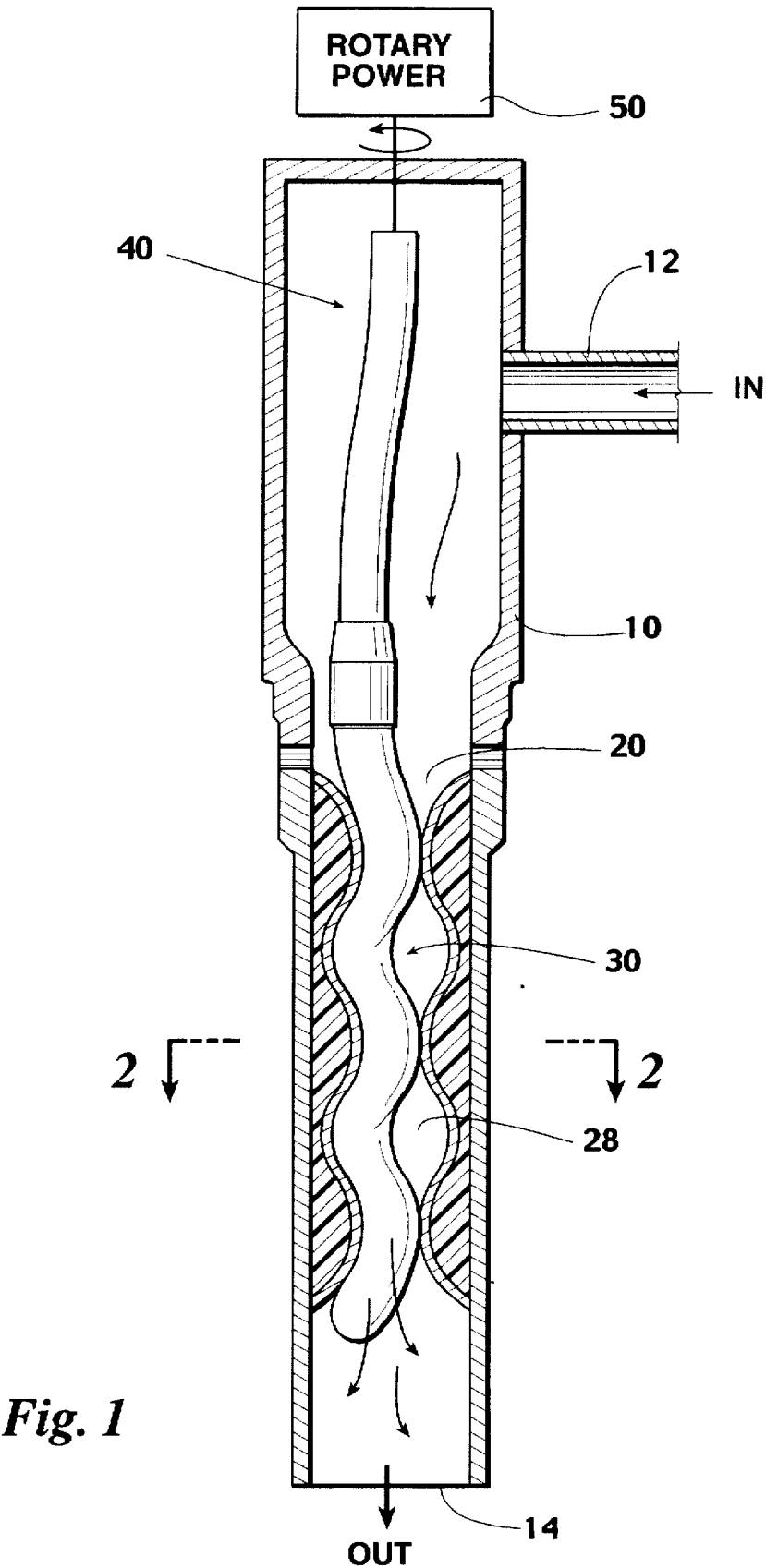
FIG. 1 is a sectional view of a typical progressive cavity pump.

FIG. 1 is a simple representative of a typical progressive cavity or Moineau type pump. Such pumps include a basic housing 10 through which the materials to be pumped are fed through conduit 12 to the outlet of the pump 14. As is well known in the art, the pump itself is made up of the helicoid stator, generally designated by the numeral 20, and a matching helicoid rotor, generally designated by the numeral 30. The rotor is attached to a flex shaft, generally designated by the numeral 40, which is then connected to a rotary power source 50 through appropriate and sealed shafting 52. It is to be understood, however, that the invention is applicable to other forms of progressive cavity pumps such as disclosed in U.S. Pat. No. 5,417,281 and co-pending application Ser. No. 08/447,122, filed May 22, 1995. That is, the invention herein is directed for use in all forms of progressive cavity pump applications, the invention being in the makeup of the stator and/or the rotor and/or flex shaft utilizing composite materials. Composite materials are typically defined to include carbon fibers, boron fibers, ceramic fibers, glass fibers, thermoplastic fibers, natural fibers, metallic fibers, fibrous reinforced fabrics, tapes and synthetic fibers, all of which are typically impregnated with thermal setting resins. Typical of such thermal setting resins are the alkyd polyesters, general purpose epoxy, general purpose phenolic and urea-formaldehyde compositions.

THE STATOR

The stator formulations of this invention are best described herein with reference to the cross-section shown in FIGS. 2 and 3 which are used herein to describe the various alternate embodiments by reference to those portions of the stator identified as 22, 24 and 26, the latter being the surface by which the rotor 30 will sealably function within the cavity 28. The various embodiments are capable of being formed by a variety of methods, including molding and/or machining and thus, provide formulations that can be adapted to a variety of pump uses and environments. Although the drawings indicate the use of an outer housing 10, it is to be understood that the invention herein could be made up utilizing the stator area without the outer housing 10.

EMBODIMENT A

In this embodiment, areas 22 and 24 are of a composite material which acts as a supportive structure for the helicoid interface 26 of a rubber elastomer. The rotor, generally designated by the numeral 30, is comprised of steel or composite materials as hereinafter described.

EMBODIMENT B

In this embodiment, areas 22 and 24 are made of a composite material, while the helicoid liner 26 is a thermoplastic resin.

EMBODIMENT C

In this embodiment, composite material will make up the total stator, including areas 22, 24 and 26.

EMBODIMENT D

In this embodiment, areas 22 and 24 are of hardened materials, either machinable or moldable, such as steel or ceramics, with the bonded inner lining 26 being formulated of a composite material.

EMBODIMENT E

The supportive structure is 22 and 24 comprised of a composite material wherein the resin is formulated to have some elastomeric properties with the inner rotor contact surface 26 being of composite material having little or no elastomeric properties. Such a stator of this embodiment will provide an improved sealing surface between the rotor and stator surfaces, thereby increasing mechanical efficiency as well as reducing heat during the pumping action. This construction allows for expansion and contraction of the stator parts together, since the thermal transfer coefficient of the composite is higher and capable of wicking off the resulting frictional heat caused by the pumping action.

EMBODIMENT F

Areas 22 and 24 would be comprised of a rubber elastomer with the inner rotor contact surface 26 being a bonded composite material. In this embodiment, the elastomer becomes protected from any deteriorating or abrasive produced fluids and solids and destructive friction between the rotor and stator.

Referring now to FIG. 3, a combination stator and rotor is configured in a variety of manners. In one embodiment, the stator inner face 26 would be of a composite having elastomeric properties with the supporting outer zones 22/24 being a non-compressible composite for use with rotors of steel or non-compressible composite. Various combinations are possible when the rotor 30 is of two part construction of an inner core 98 and outer surface 100. For instance, if the inner core 98 is a non-compressible composite and the outer surface 100 elastomeric composite or rubber, the preferred stator comprising areas 22, 24 and 26 would be non-compressible. Vice-versa, if the core 98 is an elastomeric composite and the outer surface 100 is a non-elastomeric composite, the stator 20 elements 22, 24, and 26 would be a non-elastomeric, non-compressible composite, or surface 26 an elastomeric composite, while area 24 and 26 are non-compressible composites.

ROTOR AND FLEX SHAFT

Figure 6:
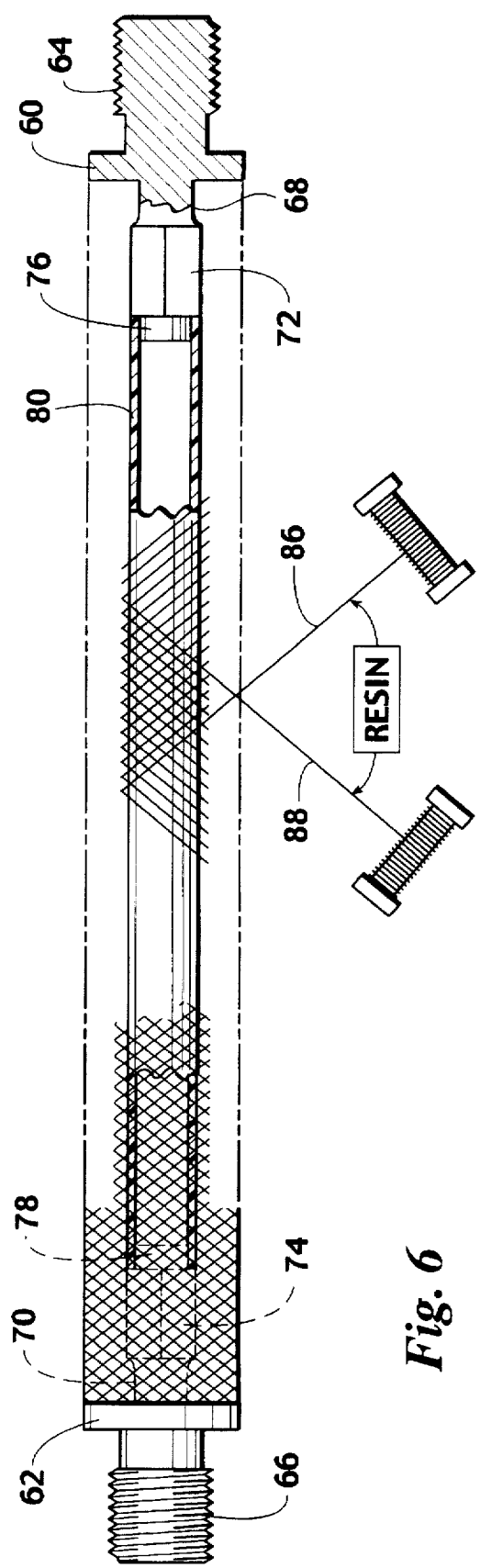
FIG. 6 is a view describing one method of forming a flex shaft and/or rotor for a progressive cavity pump.

In the preferred embodiment of this invention for use with any of the stator embodiments, the rotor is formed of an all composite material. An additional embodiment is to form the rotor, generally designated by the numeral 30, and the flex shaft, generally designated by the numeral 40, as a single unitary member such as shown in FIG. 4 or as a separate rotor as shown in FIG. 5 which can be attached to a separately made flex shaft such as the type shown in FIG. 6. The rotor and the flex shaft can be formed in a variety of ways such as utilizing a resin transfer mold (RTM) for making complex configurations. One method of forming a flex shaft and/or rotor is shown in FIG. 6. Metal or composite end fittings 60 and 62 are used which include an outer molded or machine threaded portion 64 and 66 respectively for connection to the rotor at one end and the rotary power source at the other. The fittings include first inner shoulders 68 and 70 for retaining the composite fibers axially to provide tensile and shear strength. Adjacent the inner shoulders are polygonal, usually hexagonal, surfaces 72 and 74 respectively. Inner cylindrical portions 76 and 78 provide a surface to retain a mandrel 80. Mandrel 80 may be any form of material, plastic or metal and is used to assemble the parts and provide support for the process of forming the composite structure of the flex shaft. The mandrel 80 is to have flexibility in and of itself. After assembly of parts 60, 62 and 80, the process of winding resin impregnated composite fibers occurs by rotating the assembly relative to the resin impregnated composite fibers 86 in one angular direction and fibers 88 in the opposite direction, typically 45° as shown, or by rotating the fibers around the mandrel, until the height thereof matches the outer diameter of flanges 60 and 62. Each layer adds anywhere from between 0.025 to 0.040 inches (0.64 to 1.0 mm) per layer. The resin used makes up about 40% of the resulting composition, and because of the wrapping of the layers of composite 86 and 88 in the manner shown, the fibers are oriented at an angle to the sheer plane of the flex shaft. Thus, such a construction, as described, permits the orbital or eccentric movement of the flex shaft relative to an axial power source required to operate a progressive cavity pump.

Ordinarily, the flex shaft and rotor used in progressive cavity pumps are made of steel. Utilizing a composite flex shaft permits the use of materials which are anti-isotropic. To make a steel flex shaft more flexible consists of either reducing the wall thickness or making the diameter smaller. Both of these methods reduce the strength of a metallic flex shaft, especially to fatigue. Utilization of a type of composite fiber and the alignment of these fibers permits a larger wall thickness while providing maximum strength and maximum flexibility required in the eccentric orbital motion. Composite materials are inherently better in fatigue application than metals, nor will they rust, corrode or react with the chemicals found in oil production environment; yet, the materials can be used in environments exceeding 600° F. (315° C.). Overall, the strength, fatigue and stiffness of composite materials are found to be equal to and in most cases exceeding the specifications of metals, including titanium, steel, aluminum, etc.

One example of a progressive cavity pump comprised constituent material of:

E-Type Fiberglass of Owens Corning.

DPL Epoxy Resin from Shell Chemical Co.

Lindride 6K hardener from Lindeau Company.

Uncurred sheet rubber 0.075" thick was loaded with Teflon® and lubricant supplied by Kirkhill Rubber Co. The stator was formed by laying up strips of the rubber on a helicoidal mandrel. The composite of fiberglass and resin plus hardener in a ratio of 100/88 resin/hardener were then filament wound over the rubber. The assembly was then cured in an oven at a temperature of approximately 300° F. (150° C.). The composite becomes essentially non-compressible. The helicoid rotor was steel. Initial tests indicated a longer run life to failure than an ordinary elastomeric rubber stator.

A flex shaft was constructed as per FIG. 6:

E-Type Fiberglass,

DPL Epoxy Resin

Lindride 6K Hardener, and

Machined Metal End Fittings

A thin, flexible tube 80 of polyolefin, sold by Phillips Petroleum under the name DRISCOLL, acts as a mandrel that is bonded to and holds the end fittings 60 and 62 in space. Next, the fiberglass and epoxy is filament wound as shown ±45° (88 and 86) over the assembly until it is built up to the desired outer diameter.

Figure 7:
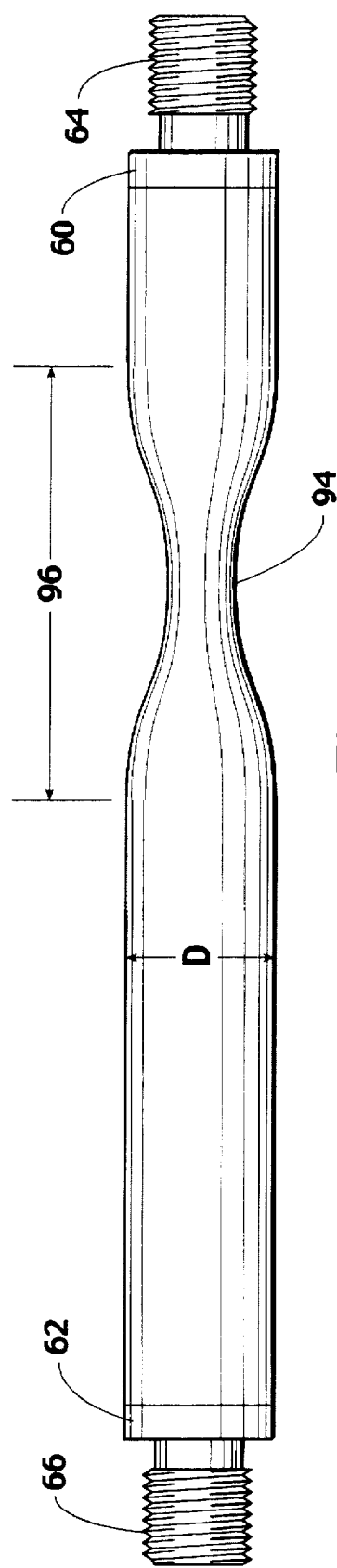
FIG. 7 is an elevational view of an alternate form of flex shaft with a built-in flex point.

Another embodiment of flex shaft is shown in FIG. 7 being so constructed to create a flex point 94 formed as a concave indentation less than diameter D. The location of the flex point will vary with the characteristics of the pump including size of the pump, material to be pumped, etc. The flex point can be formed by changing, via computer controlled means, the angular direction of the composite fibers and/or resin materials at the point or area where flex is desire. For instance, during a filament winding at +45° and -45° up to section 96 (FIG. 7), the angular direction would be changed to angles less than 45° to create a flex section without decreasing overall diameter D.

The terms "elastomeric" or "resilient" as used with reference to composites is accomplished by variations in the composite fibers and/or the resin formulations to achieve the desired characteristic. For example, HELOXY flexablizer by Shell Chemical Co. is added to the DPL-862 Epoxy Resin in an amount within the range of 20–40% by weight. This is then mixed with a hardener and TEFLON® powder in an amount to maintain a workable (flowable) mixture which is then applied to the fiber in the formation of a stator and/or rotor. The resulting composite is oven cured at 300°–400° F. (150°–200° C.) for approximately four hours.

What is claimed is:

1. A progressive cavity pump comprising:

a stator, said stator formed of a unitary support section having an outer cylindrical surface and a bonded internal helical surface section, said support section comprised of a substantially non-resilient composite material body formed of a filament fiber impregnated with a thermal setting resin; and said helical surface section comprised of a bonded resilient elastomer material.

2. A progressive cavity pump comprising:

a stator, said stator formed of a unitary support section having an outer cylindrical surface and a bonded internal helical surface section, said support section comprised of a substantially non-resilient composite material formed of a filament fiber from the group of carbon fibers, boron fibers, ceramic fibers, glass fibers, thermoplastic fibers, natural fiber, metallic fibers, and synthetic fibers which are impregnated with a thermal setting resin;

said helical surface section comprised of a bonded resilient elastomer material;

a helical rotor operational within said stator; and means to rotate said rotor.

3. The pump of claim 2 wherein said rotor is a rigid composite.

4. The pump of claim 2 wherein said means to rotate said rotor includes a composite material flex shaft, said flex shaft comprised of a body formed of spaced metal end fittings for connection to said means to rotate and to said rotor, a flexible and axial mandrel connected to each said fitting, and composite filament and resin windings around said mandrel to create said body.

5. The pump of claim 4 wherein said filament windings and resin are wound at alternate angles of +45° and –45° to the axis of said mandrel.

6. The pump of claim 4 wherein a flex section is created in said flex shaft.

7. The pump of claim 6 wherein said portions of said filament windings and resin are wound at angles of 45° to said axis while another portion is wound at <45° to create said flex section.

8. The pump of claim 6 wherein said flex section is formed of an inward indentation.

9. The pump of claim 8 wherein said indentation is curved.

10. The pump of claim 9 wherein said curve is concave in axial cross-section.

11. The pump of claim 2 wherein said flex shaft comprises a body formed of spaced composite end fittings for connection to said means to rotate and to said rotor, a flexible and axial mandrel connected to each said fitting, and composite filament and resin windings around said mandrel to create said body.

12. The pump of claim 11 wherein said filament windings and resin are wound at alternate angles of +45° and 45° to the axis of said mandrel.

13. The pump of claim 11 wherein a flex section is created in said flex shaft.

14. The pump of claim 13 wherein said portions of said filament windings and resin are wound at angles of 45° to said axis while another portion is wound at <45° to create said flex section.

15. The pump of claim 13 wherein said flex section is formed of an inward indentation.

16. The pump of claim 15 wherein said indentation is curved.

17. The pump of claim 16 wherein said curve is concave in axial cross-section.

* * * * *

UNITED STATES PATENT AND TRADEMARK OFFICE
CERTIFICATE OF CORRECTION

PATENT NO. : 5,759,019
DATED : June 2, 1998
INVENTOR(S) : Steven A. Wood et al.

It is certified that error appears in the above-identified patent and that said Letters Patent is hereby corrected as shown below:

Col. 6, line 53, delete "and 45°" and substitute -- and -45°-- therefor.

Signed and Sealed this

Fifth Day of January, 1999

Attest:

Attesting Officer

Acting Commissioner of Patents and Trademarks